(12) United States Patent
Nedrelid

(10) Patent No.: US 11,339,060 B2
(45) Date of Patent: May 24, 2022

(54) RETROFIT BOTTLE FILTRATION DEVICE

(71) Applicant: Nils Nedrelid, Vero Beach, FL (US)

(72) Inventor: Nils Nedrelid, Vero Beach, FL (US)

(*) Notice: Subject to any disclaimer, the term of this patent is extended or adjusted under 35 U.S.C. 154(b) by 0 days.

(21) Appl. No.: 17/185,900

(22) Filed: Feb. 25, 2021

(65) Prior Publication Data

US 2021/0261436 A1    Aug. 26, 2021

Related U.S. Application Data

(63) Continuation-in-part of application No. 17/005,161, filed on Aug. 27, 2020.

(60) Provisional application No. 62/992,756, filed on Mar. 20, 2020, provisional application No. 62/981,419, filed on Feb. 25, 2020.

(51) Int. Cl.
| | |
|---|---|
| *B65D 47/32* | (2006.01) |
| *B65D 41/34* | (2006.01) |
| *E03B 3/02* | (2006.01) |
| *C02F 1/00* | (2006.01) |
| *C02F 101/00* | (2006.01) |
| *C02F 103/00* | (2006.01) |
| *A45F 3/16* | (2006.01) |

(52) U.S. Cl.
CPC .............. *C02F 1/003* (2013.01); *B65D 41/34* (2013.01); *B65D 47/32* (2013.01); *E03B 3/02* (2013.01); *A45F 2003/163* (2013.01); *C02F 2101/00* (2013.01); *C02F 2103/001* (2013.01); *C02F 2307/02* (2013.01)

(58) Field of Classification Search
CPC ...... B65D 41/34; B65D 47/243; B65D 47/32; C02F 1/003; C02F 2307/02; A45F 2003/163
See application file for complete search history.

(56) References Cited

U.S. PATENT DOCUMENTS

| | | |
|---|---|---|
| 6,565,743 B1 | 5/2003 | Poirier et al. |
| 7,081,201 B2 | 7/2006 | Bassett et al. |
| 8,926,840 B2 | 1/2015 | Hull et al. |
| 9,469,550 B2 * | 10/2016 | Closi, Jr. .................. C02F 1/002 |

OTHER PUBLICATIONS

Lifestraw.com, LifeStraw Flex with Collapsible Squeeze Bottle, 2018.
Doulton.com, Blue Doulton® Taste Reusable Filter Water Bottle, (downloaded Jan. 2020).

* cited by examiner

*Primary Examiner* — Terry K Cecil

(57) ABSTRACT

An apparatus provides a water bottle mouthpiece attachment which can filter microplastics and other contaminant substances from bottles, particularly disposable plastic water bottles. The filter of the apparatus includes a filter housing that is attached to a cap that fits inside a common plastic bottle. Soft rubber rings, tapering from to radially larger on the top to radially smaller on the bottom in a generally conical fashion, ensure a watertight fit to the inside opening of any drinking bottle. A friction closing/opening spout at the top of the filter enables selective opening of the bottle and prevents accidental spillage of bottle contents. The filter housing is also offset from the center, giving space to an air valve that allows air to enter the bottle without disturbing the flow of water from the bottle, thus providing optimal lamellar flow without allowing fluid to escape through the air valve during consumption.

20 Claims, 10 Drawing Sheets

RETROFIT BOTTLE FILTRATION DEVICE

The current application claims a priority to the U.S. Provisional Patent application Ser. No. 62/981,419 filed on Feb. 25, 2020.

FIELD OF THE INVENTION

The present invention relates generally to consumer bottle attachments and filtering systems. More specifically, the present invention provides a water bottle mouthpiece attachment to filter out microplastics and other micro substances.

BACKGROUND OF THE INVENTION

Recent studies have shown that microplastics are found in all types of bottled water. One study that tested 11 brands of bottled water sold in the US concluded that while the average amount of microplastics found in bottles was 325 microplastic particles per liter, one sample was found to contain more than 10,000 particles per liter. It is believed that at least some of these contaminant particles came from the packaging material. The most common particle that was found was polypropylene, the material commonly used to make the caps. Much research is going into studying the effects of digesting microplastics by humans, and a wide range of diseases have been attributed to their consumption so far. The World Health Organization (WHO) is presently launching an inquiry into this.

An objective of the present invention is to provide a filter for plastic bottles. The filter of the present invention includes a filter housing that is attached to a cap that fits inside a common plastic bottle. Soft rubber rings, tapering from to radially larger on the top to radially smaller on the bottom in a generally conical fashion, ensure a watertight fit to the inside opening of any common plastic bottle. A friction closing/opening spout at the top of the filter enables selective opening of the bottle and prevents accidental spillage of the contents of the bottle. The filter housing is also offset from the center, giving space to a check valve (air valve) that allows air to enter the bottle without disturbing the flow of water from the bottle, thus providing optimal lamellar flow without allowing fluid to escape through the air valve. In preferred usage, the cap from a new disposable bottle may be discarded, and the filter of the present invention may be subsequently pressed into the opening until a tight fit is achieved. When drinking, the pull-top is pulled up to open the bottle, and water is forced through the filter by squeezing the bottle, through suction from the user, or through gravity. After taking a sip of water, air can flow back into the bottle through the check valve to avoid a vacuum build-up inside the bottle. When not drinking from the bottle, the top can be closed by pressing the pull top down. After the bottle is empty, the filter can be removed and used in another bottle.

DETAILED DESCRIPTION OF THE INVENTION

All illustrations of the drawings are for the purpose of describing selected versions of the present invention and are not intended to limit the scope of the present invention.

Figure 1:
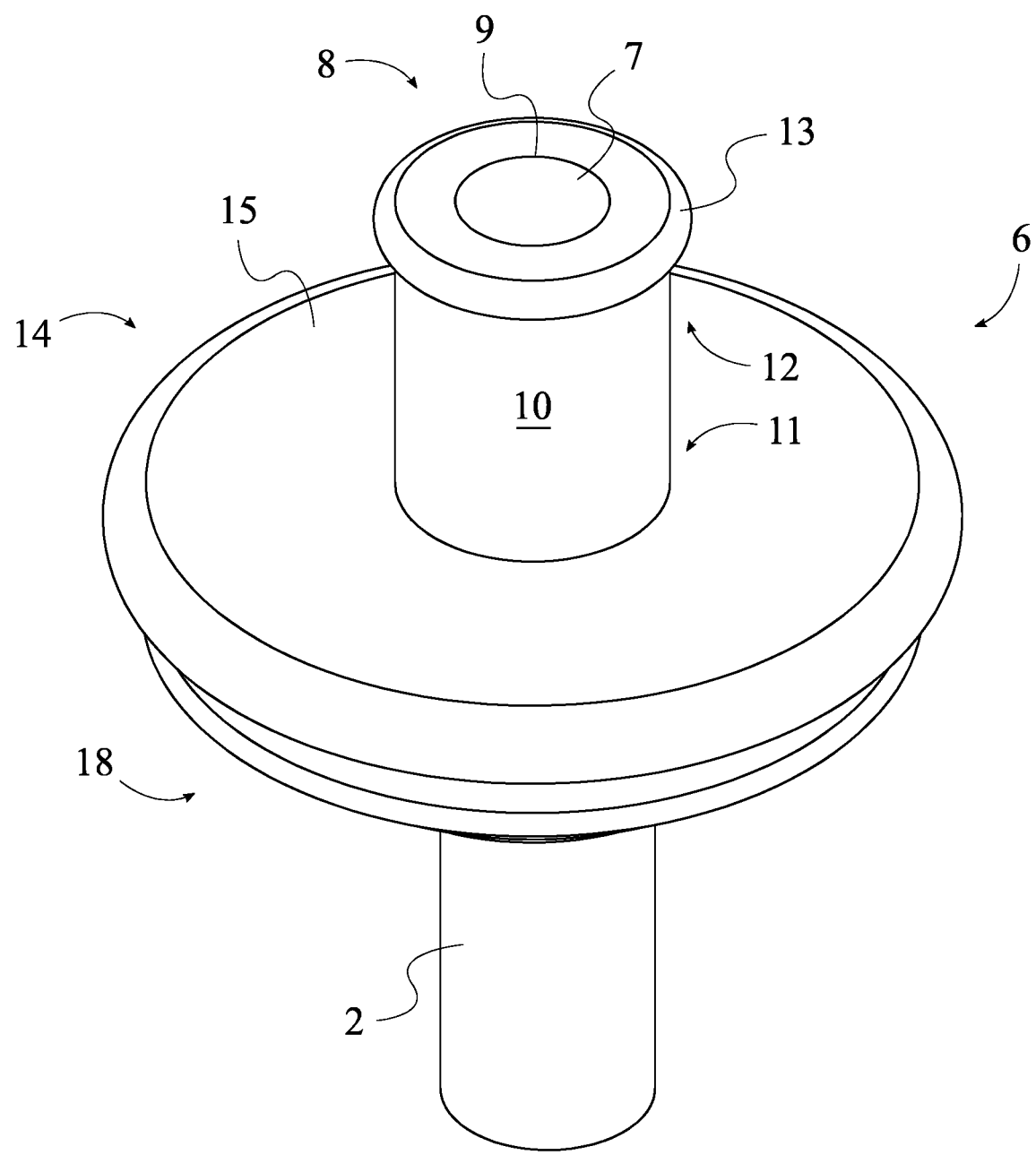
FIG. 1 is a top perspective view of the present invention with the cap closed.
Figure 2:
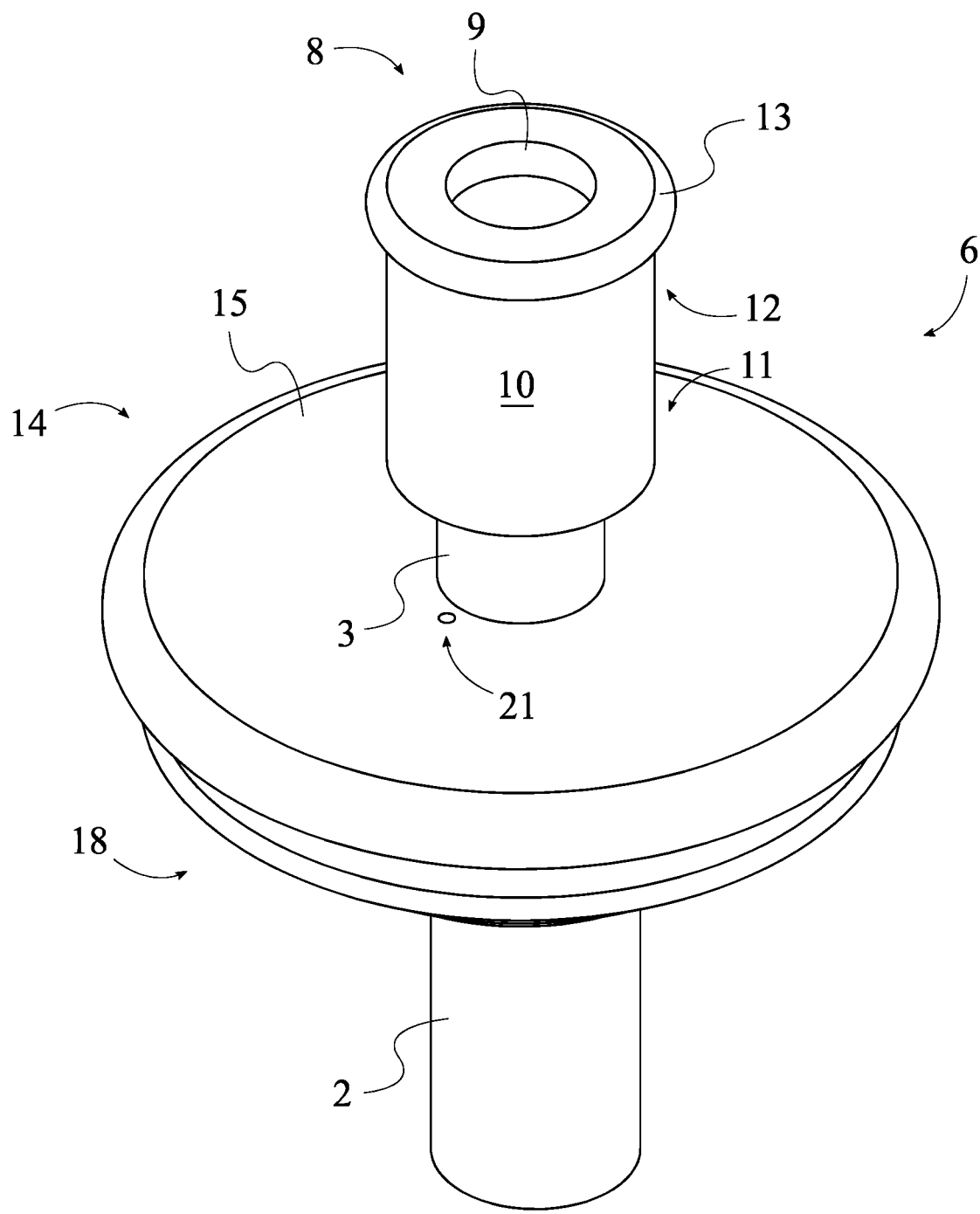
FIG. 2 is a top perspective view of the present invention with the cap opened.

The present invention is a retrofit bottle filtration device that is used to provide a reusable mouthpiece for consumption or dispensation of fluids from a receptacle, especially from a disposable plastic water bottle. The present invention is configured to provide lamellar flow of water or other liquids by allowing air to enter the bottle while the contained fluid exits the bottle. The present invention may comprise an elongated filter 1, an elongated housing 2, a fluid tube 3, a fluid-dispensing mechanism 6, and a bottle-opening adapter 14, as shown in FIG. 1. The elongated filter 1 relates to any of a variety of fluid filtration tools capable of separating drinkable water or liquid from various contaminants, including, but not limited to, microplastics, nitrates, phosphates, turbidity, dust, particulate matter, and more. The elongated filter 1 may include any or any combination of carbon filters, mesh filters, activated charcoal filters, activated alumina filters, reverse osmosis filters, ceramic filters, and more in a variety of configurations as desired. The elongated housing 2 denotes a hollow cylindrical extrusion which arranges the elongated filter 1 appropriately within the present invention. The fluid tube 3 is the hollow unit shown in FIG. 2 through which, in a preferred usage of the present invention, water or other liquids flow after being filtered by the elongated filter 1. The fluid-dispensing mechanism 6 relates to a controllable opening that a user may toggle open or close in order to allow or prevent fluid from exiting a bottle. The bottle-opening adapter 14 is the system used to connect the present invention to the mouth of a receptacle, especially a bottle.

The general configuration of the aforementioned components allows the present invention to efficiently and effectively dispense or consume fluid from a bottle or similar receptacle. The fluid tube 3 comprises a first tube end 4 and a second tube end 5. The first tube end 4 is the portion of the fluid tube 3 that is generally proximal to the elongated housing 2. The second tube end 5 is the portion of the fluid tube 3 opposite the first tube end 4 that is generally proximal to a cap. The fluid-dispensing mechanism 6 comprises a stopper 7 and a mouth cap 8. The stopper 7 is a rigid unit positioned appropriately to allow or prevent flow of fluid through the mouth cap 8. The mouth cap 8 is the rigid unit which, in a preferred usage of the present invention, contacts a user's lips during consumption of the filtered contents of a bottle. The bottle-opening adapter 14 comprises an annular lid 15 and a plurality of flexible annular fins 18. The annular lid 15 is a rigid, generally disk-shaped extrusion capable of both providing a grasping mechanism for a user of the present invention and defining a surface against which a user may, in some uses of the present invention, press the user's lips during consumption of the filtered contents of a bottle.

The plurality of flexible annular fins 18 relates to a linear pattern of semirigid disks which may create a snug and firm friction fit within the opening of a bottle. The mouth cap 8 comprises a fluid channel 9 and a cap body 10. The fluid channel 9 relates to an opening through which fluid may pass for consumption or dispensation.

Figure 3:
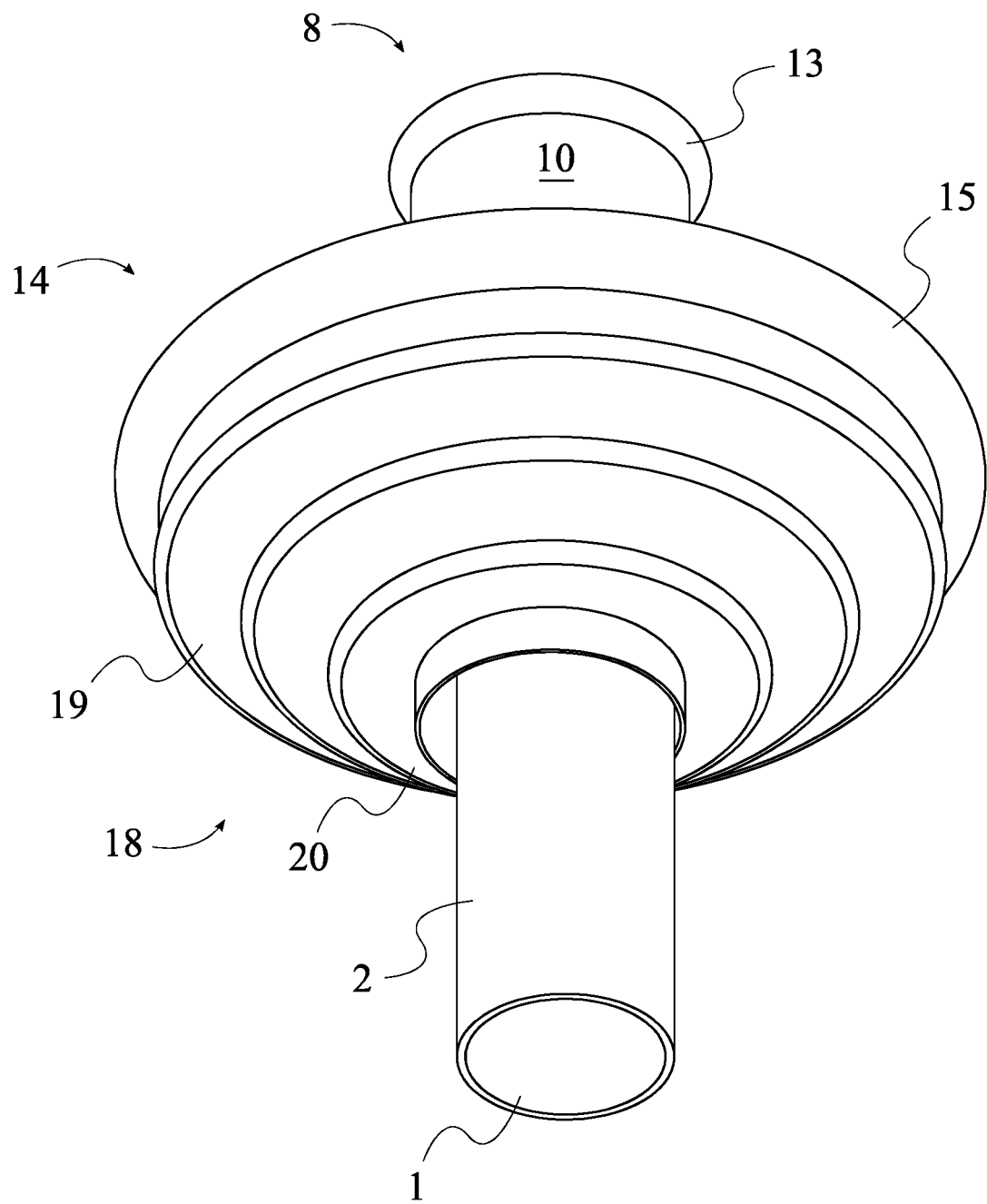
FIG. 3 is a bottom perspective view of the present invention.

The cap body 10 denotes the volume of space occupied by the mouth cap 8. The elongated filter 1 is mounted within the elongated housing 2. This arrangement results in appropriate arrangement of the elongated filter 1, as shown in FIG. 3. The elongated housing 2 is connected adjacent to the first tube end 4. Thus, the elongated housing 2 positions the elongated filter 1 proximal to the first tube end 4. The cap body 10 is positioned adjacent to the second tube end 5. In this way, the cap body 10 is positioned to regulate fluid flow out of the fluid tube 3. The cap body 10 is hermetically and slidably mounted about the fluid tube 3. This arrangement prevents fluid from entering or exiting from between the cap body 10 and the fluid tube 3. The fluid channel 9 traverses through the cap body 10. In this way, the cap body 10 may guide fluid out of the present invention through the fluid channel 9.

Figure 5:
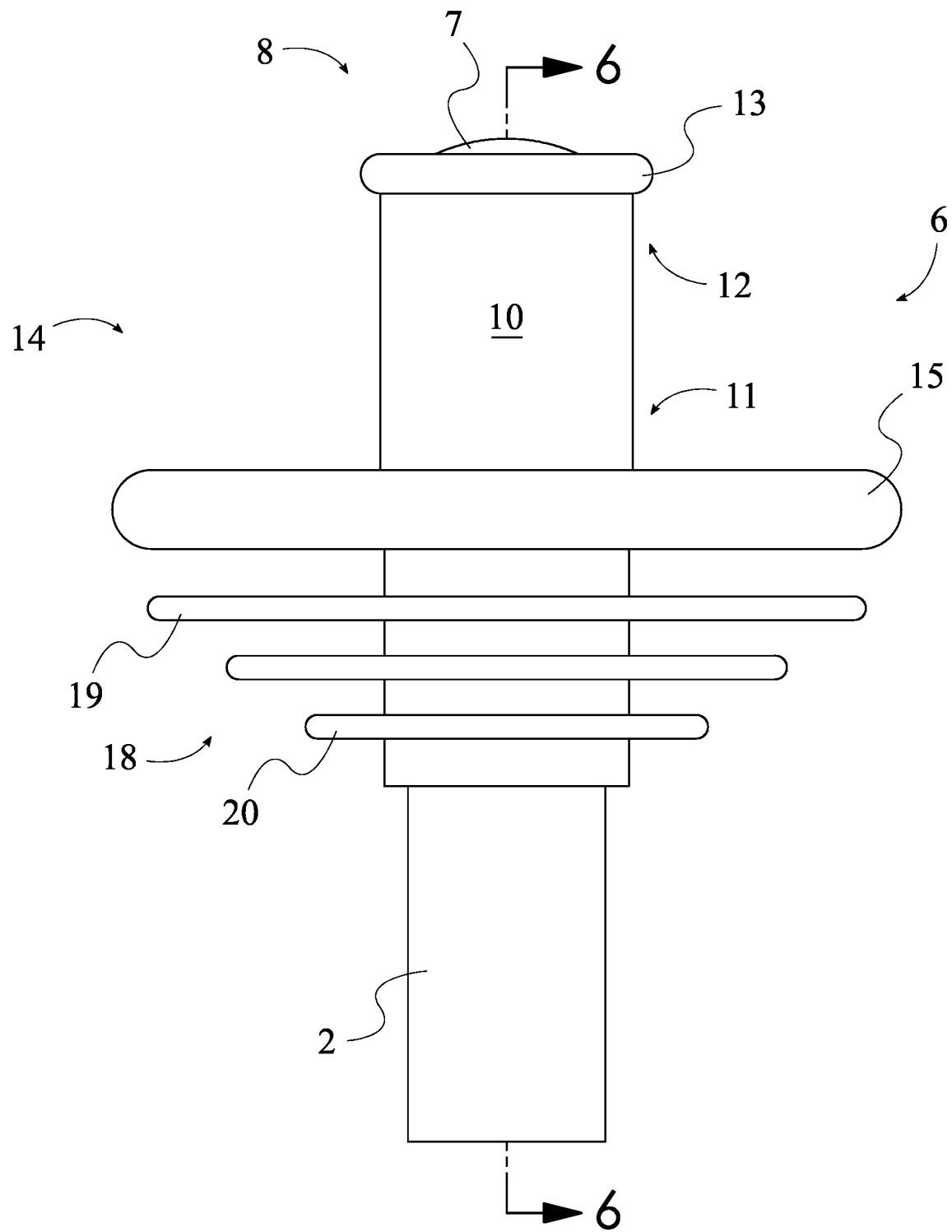
FIG. 5 is a front view of the present invention with the cap closed.

The fluid channel 9 is positioned collinear to the fluid tube 3. This arrangement ensures optimal flow of fluid through the fluid channel 9 and the fluid tube 3. The stopper 7 is operatively integrated between the cap body 10 and the second tube end 5, wherein the stopper 7 is used to selectively restrict fluid from exiting from the second tube end 5 and through the mouth cap 8. Thus, the cap body 10 may shift into an opened configuration relative to the stopper 7 to allow fluid to pass through the present invention or may shift into a closed configuration relative to the stopper 7 to prevent fluid from passing through the present invention, as the user desires. The mouth cap 8 is in fluid communication with the elongated filter 1 by the fluid tube 3. This arrangement ensures that fluid passing through the mouth cap 8 has already been appropriately filtered by the elongated filter 1. The annular lid 15 is positioned offset from the plurality of flexible annular fins 18, as shown in FIG. 5. In this way, the annular lid 15 allows for intuitive mounting of the present invention within an opening of a bottle. The plurality of flexible annular fins 18 is laterally connected around the elongated housing 2. In this way, the plurality of flexible annular fins 18 may be used to arrange the elongated housing 2, and thus, the elongated filter 1, appropriately within a bottle. The annular lid 15 is laterally connected around the fluid tube 3. This arrangement ensures that the fluid tube 3 can be arranged through appropriate positioning of the annular lid 15 atop a bottle opening.

Figure 4:
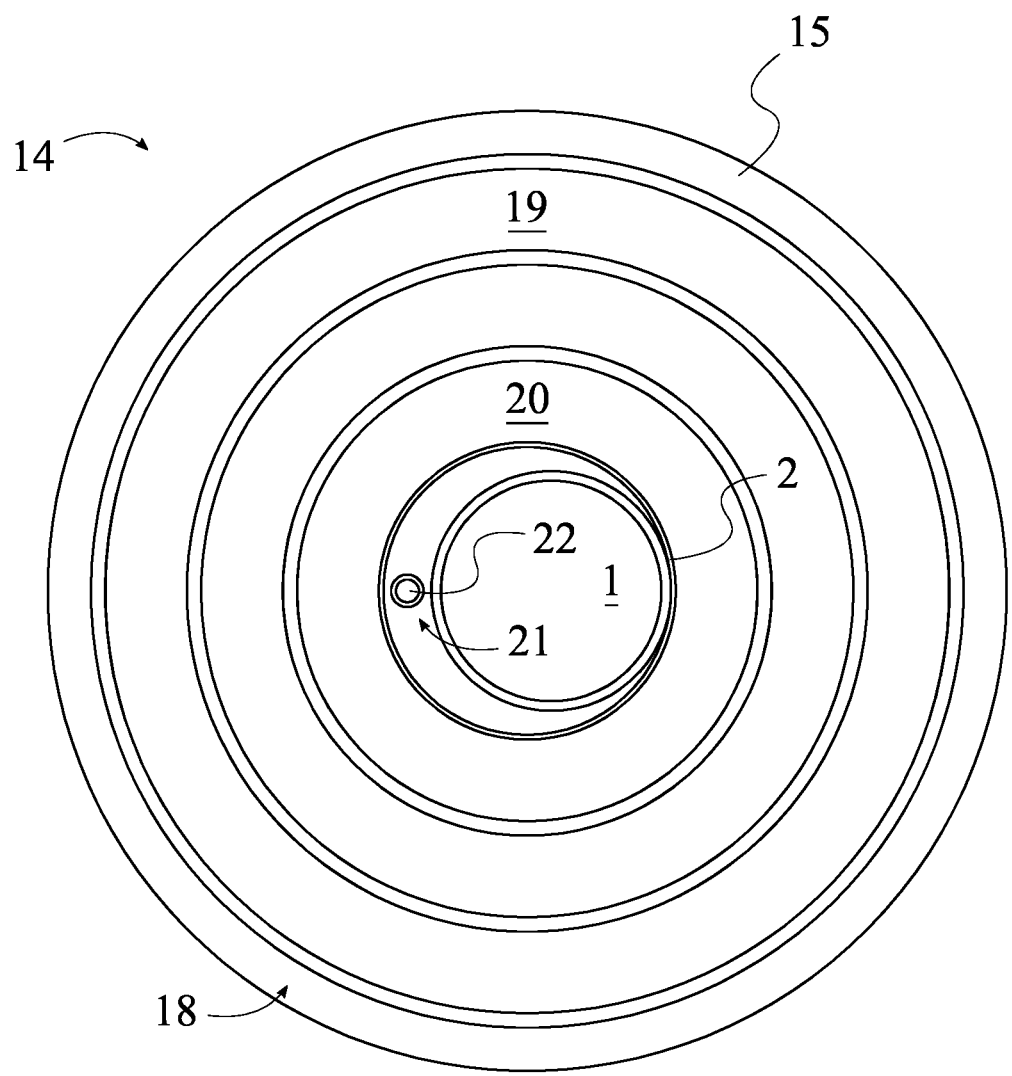
FIG. 4 is a bottom view of the present invention.
Figure 6:
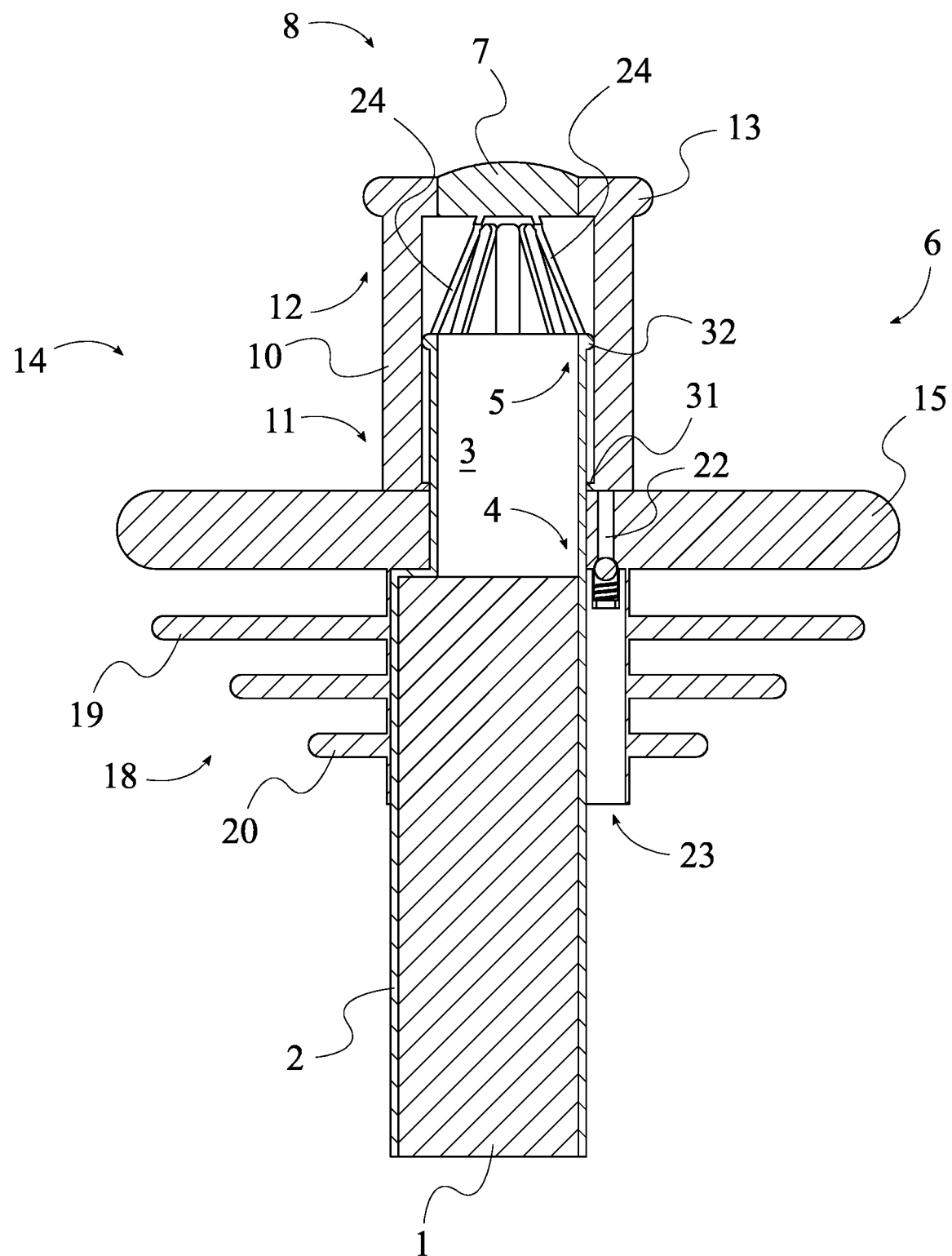
FIG. 6 is a cross-sectional view of the present invention with the cap closed.

The present invention provides the opportunity to improve fluid flow from a bottle. In order to achieve this, the present invention may further comprise an air valve assembly 21, as shown in FIGS. 4 and 6. The air valve assembly 21 is a set of components which selectively allow air to enter the bottle but do not allow water to exit. The air valve assembly 21 comprises an air tube 22 and a valved inlet 23. The air tube 22 is a generally cylindrical extrusion through which air may pass during liquid consumption. The valved inlet 23 is a one-way valve which prevents liquid from passing through the air tube 22. The valved inlet 23 is preferably a ball-spring valve, where vacuum pressure from inside the bottle compresses the spring and the ball separates from the air tube 22, allowing air to fill the vacuum. The air valve assembly 21 is laterally positioned to the fluid tube 3. This arrangement enables air entering the air valve assembly 21 to pass into the fluid tube 3. The air tube 22 traverses through the annular lid 15 and through the plurality of flexible annular fins 18. This arrangement ensures that air can pass through whichever of the plurality of flexible fins creates the hermetic seal required to appropriately mount the present invention into a bottle. the air tube 22 is positioned adjacent to the annular lid 15. Thus, the air tube 22 may collect air from outside the present invention to pass into the bottle during use. The valved inlet 23 is operatively integrated into the air tube 22, wherein the valved inlet 23 is used to modulate fluid through the air tube 22. In this way, the valved inlet 23 allows the passage of air through the air tube 22 while preventing the potential flow of water out of the air tube 22.

The stopper 7 must be positioned appropriately to fill the fluid channel 9, thereby preventing flow of fluid out of the mouth cap 8. To this end, the present invention may further comprise a plurality of support beams 24. The plurality of support beams 24 is a set of rigid rods which allow for appropriate positioning of the stopper 7 without disturbing fluid flow. The plurality of support beams 24 is radially positioned around the second tube end 5. This arrangement ensures that each of the plurality of support beams 24 is positioned to provide optimal support of the stopper 7 during use. The plurality of support beams 24 is connected in between the stopper 7 and the second tube end 5. Thus, the stopper 7 may be held in appropriate position by the plurality of support beams 24.

Figure 7:
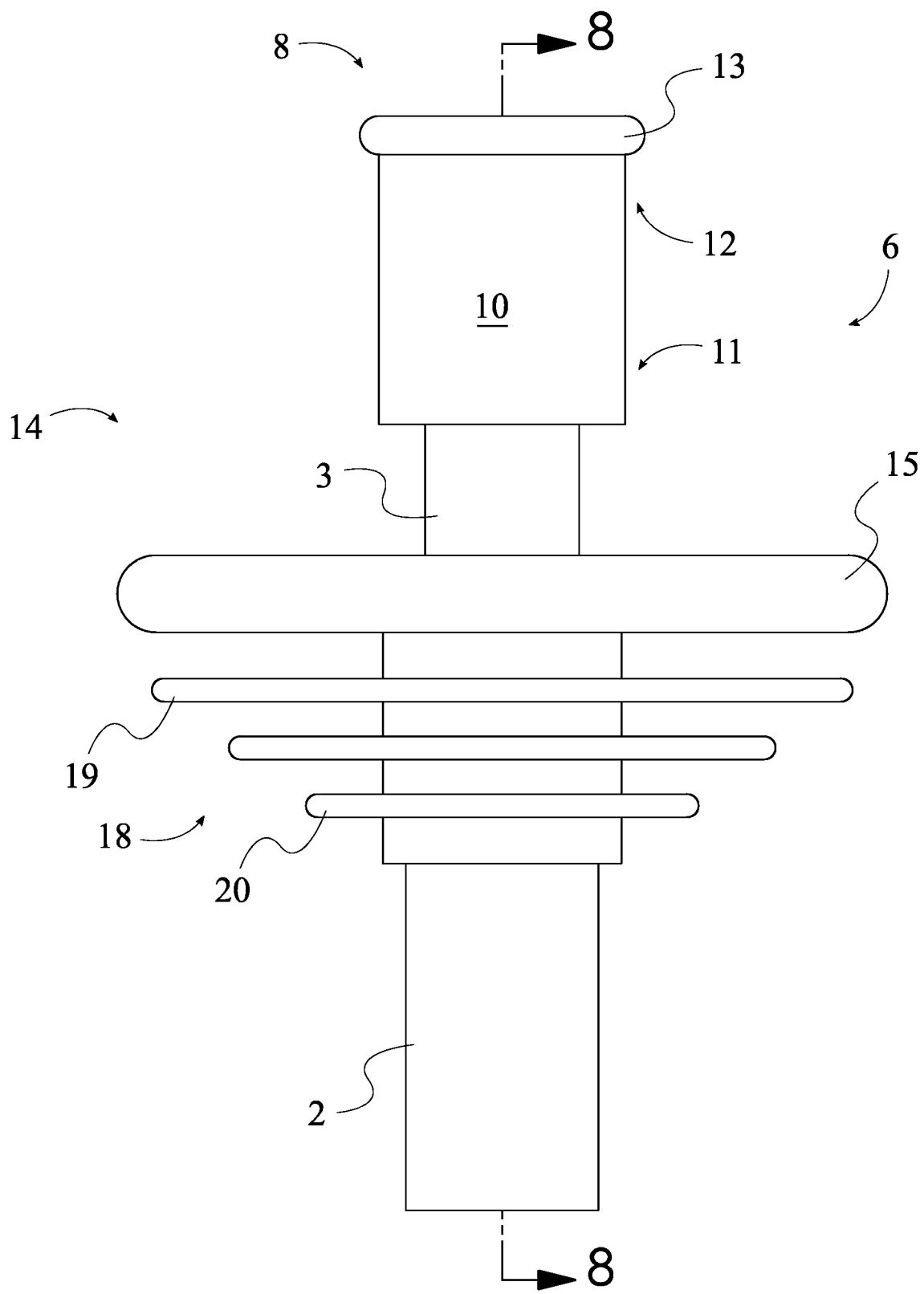
FIG. 7 is a front view of the present invention with the cap opened.

A user of the present invention requires an intuitive mechanism by which slide the mouth cap 8 into an opened position, as shown in FIG. 7. To this end, the mouth cap 8 may further comprise a first mouth cap end 11, a second mouth cap end 12, and a protruding lip 13. The first mouth cap end 11 is the segment of the cap body 10 which is preferably further from a user's mouth during fluid consumption. The second mouth cap end 12 is the segment of the cap body 10 which is preferably closer to a user's mouth during fluid consumption. The protruding lip 13 is an annular extrusion that extends from the cap body 10 to provide an intuitive gripping location for a user. The first mouth cap end 11 and the second mouth cap end 12 are positioned opposite to each other about the cap body 10. This arrangement aligns the cap body 10 with the stopper 7 and the annular lid 15. The first mouth cap end 11 is positioned adjacent to the annular lid 15. In this way, the first mouth cap end 11 is aligned with the annular lid 15 during use. The protruding lip 13 is peripherally connected around the second mouth cap end 12. Thus, the protruding lip 13 provides optimal leverage for sliding the cap body 10 towards and away from the annular lid 15.

Figure 9:
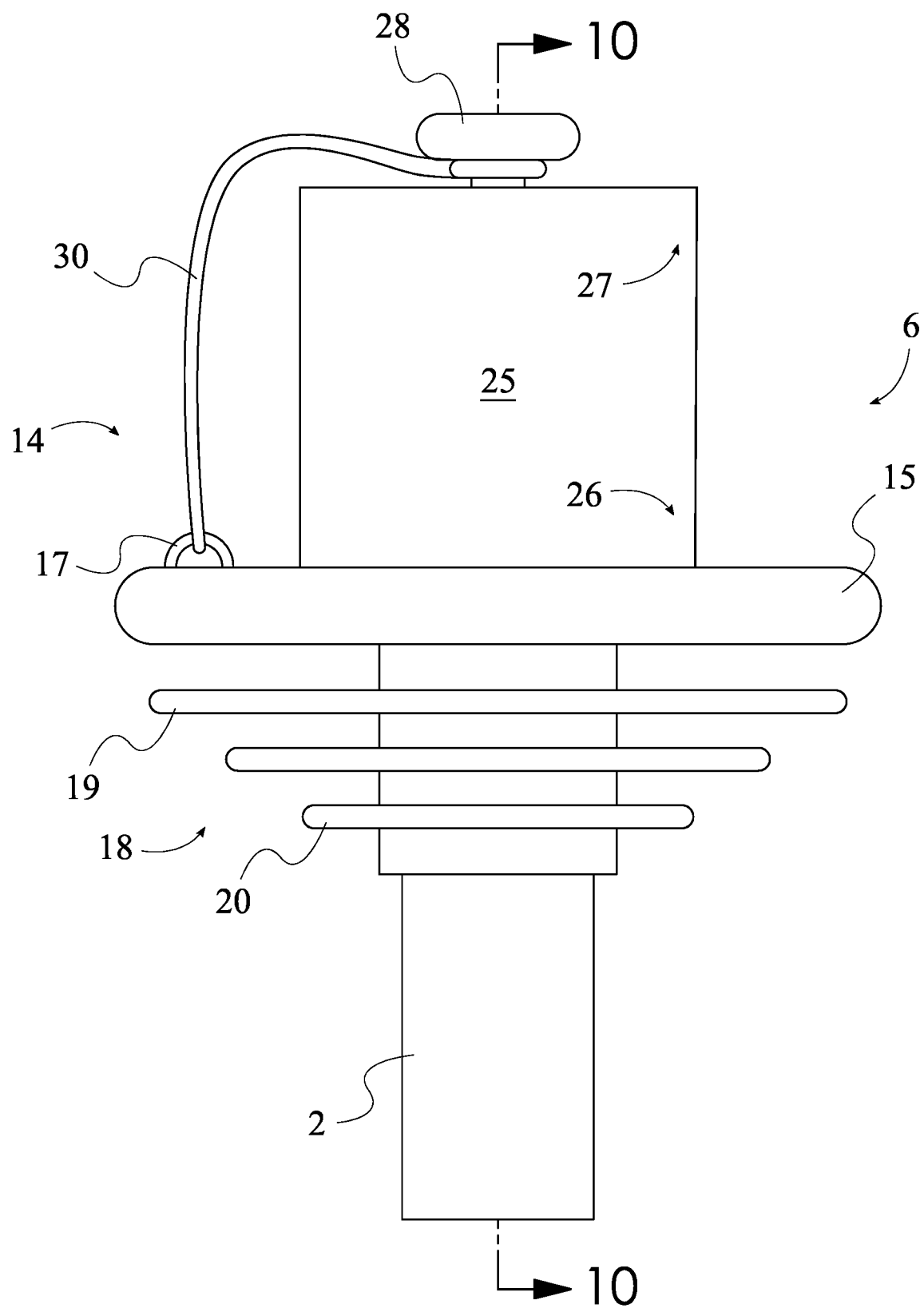
FIG. 9 is a front view of the present invention with a cap cover.

In many circumstances, it may be desirable to protect the mouth cap 8 from potential damage or contamination when the user is not consuming fluid from the bottle. To provide for this, the present invention may further comprise a mouthpiece cover 25. The mouthpiece cover 25 is a generally squared-dome shaped feature that may cover the mouth cap 8 to protect the mouth cap 8 during storage of the present invention, as shown in FIG. 9. The annular lid 15 may further comprise a cover-receiving feature 16. The cover-receiving feature 16 relates to a mechanism by which the mouthpiece cover 25 may connect to the annular lid 15. The cover-receiving feature 16 is connected onto the annular lid 15. This arrangement ensures that the cover-receiving feature 16 does not move during engagement with the mouthpiece cover 25. The cover-receiving feature 16 is positioned opposite to the plurality of flexible annular fins 18 about the annular lid 15. In this way, the cover-receiving feature 16 is able to connect and secure the mouthpiece cover 25 to the annular lid 15. The mouthpiece cover 25 is removably attached onto the cover-receiving feature 16. Thus, a user may choose when to secure or remove the mouthpiece cover 25.

Figure 10:
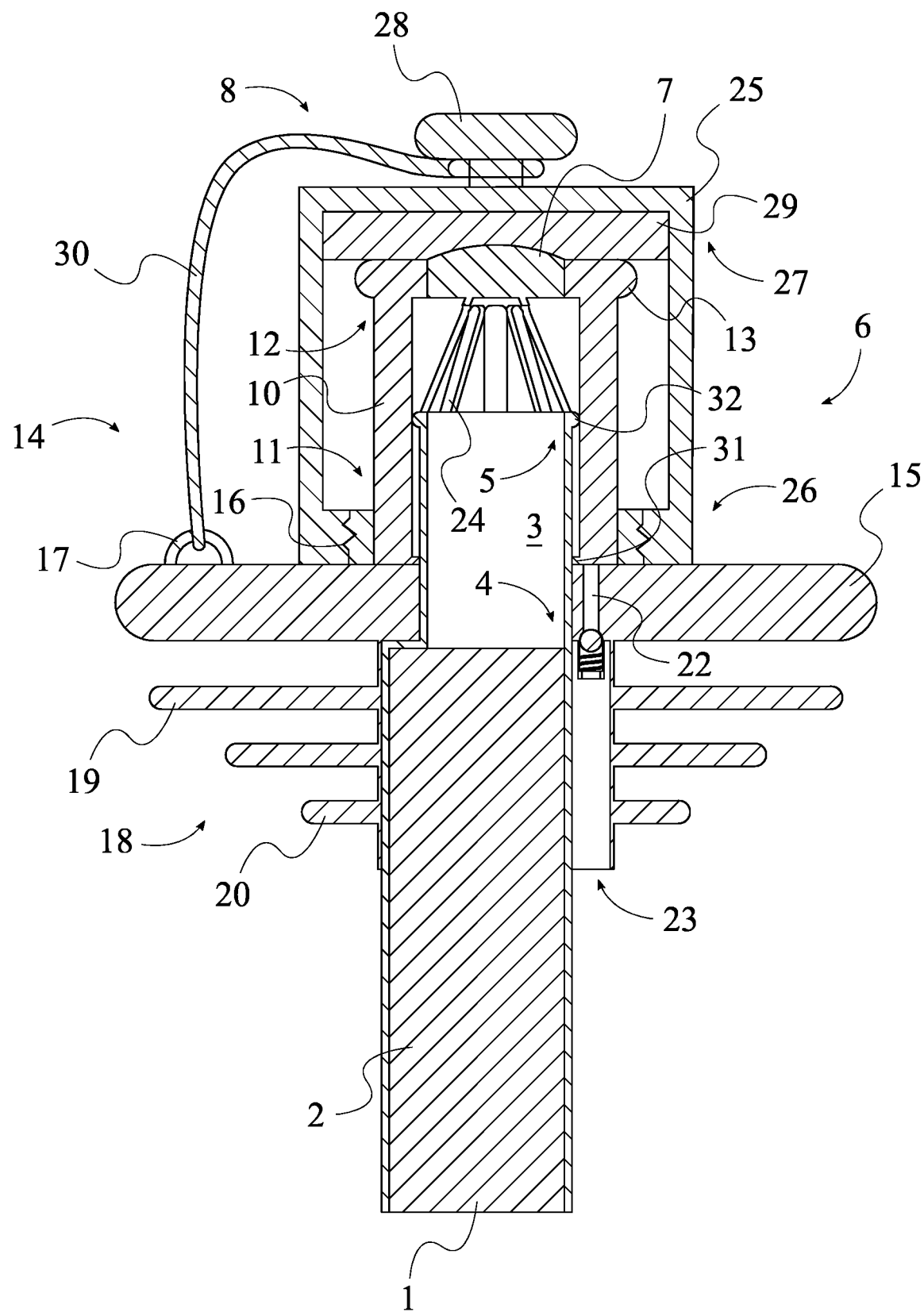
FIG. 10 is a cross-sectional view taken along line 10-10 in FIG. 9.

A user may choose to secure the mouth cap 8 into the closed configuration by pressing the mouthpiece cover 25 onto the cover-receiving feature 16, consequently sliding the mouth cap 8 closed simultaneously. To enable this, the present invention may further comprise a gasket 29, as shown in FIG. 10. The gasket 29 is a semirigid, preferably rubber or other polymeric material disk which enables damage-free contact between the mouthpiece cover 25 and the stopper 7. The mouthpiece cover 25 may further comprise a proximal cover end 26 and a distal cover end 27. The proximal cover end 26 is the segment of the mouthpiece cover 25 that, in the preferred usage of the present invention, is further from the annular lid 15. The distal cover end 27 is the segment of the mouthpiece cover 25 opposite the proximal cover end 26 that, in the preferred usage of the present invention, is closer to the annular lid 15. The proximal cover end 26 is positioned adjacent to the annular lid 15. This arrangement positions the mouthpiece cover 25 appropriately for protecting the mouth cap 8. The gasket 29 is connected within the mouthpiece cover 25, adjacent to the proximal cover end 26. In this way, the gasket 29 is positioned to contact the mouth cap 8 and, upon pressing of the mouth cap 8, the stopper 7.

It may further be beneficial to connect the mouthpiece cover 25 to the annular lid 15 securely through a more secure method. To this end, the mouthpiece cover 25 may be threadably engaged to the cover receiver, as shown in FIG. 10. This arrangement ensures that the mouthpiece over cannot shift or move when fastened to the annular lid 15.

A user may wish to address the potential issue of losing or misplacing the mouthpiece cover 25 while consuming from the corresponding bottle. To this end, the present invention may further comprise a tether 30, as shown in FIG. 9. The tether 30 is a flexible band or extrusion that joins the mouthpiece cover 25 to the annular lid 15. The annular lid 15 may further comprise a lid anchor 17. The lid anchor 17 is a segment of the annular lid 15 that enables connection of the tether 30 to the annular lid 15. The mouthpiece cover 25 may further comprise a cover anchor 28. The cover anchor 28 denotes a rigid unit extending generally from the mouthpiece cover 25 that provides a mounting mechanism for the tether 30. The lid anchor 17 is peripherally positioned to the annular lid 15. This arrangement ensures that the tether 30 cannot shift away from the annular lid 15 during use. The tether 30 is connected in between the lid anchor 17 and the cover anchor 28. Therefore, the tether 30 is able to join the mouthpiece cover 25 to the annular lid 15, preventing loss of the mouthpiece cover 25.

The plurality of flexible annular fins 18 must fit into a variety of bottles with differently-sized openings. To achieve this, the plurality of flexible annular fins 18 comprises a proximal fin 19 and a distal fin 20, as shown in FIG. 5. The proximal fin 19 is the fin of the plurality of flexible annular fins 18 generally closest to the annular lid 15. The distal fin 20 is the fin of the plurality of flexible annular fins 18 opposite the proximal fin 19 that is generally furthest from the annular lid 15. The proximal fin 19 is positioned adjacent to the annular lid 15. In this way, the proximal fin 19 is the largest of the fins available to provide a snug fit onto the opening of a bottle. The distal fin 20 is positioned offset from the annular lid 15. Conversely therefore, the distal fin 20 is the smallest fin, best adapted for connecting the present invention to the smallest possible bottle openings. The plurality of flexible annular fins 18 is distributed along the elongated housing 2 in between the proximal fin 19 and the distal fin 20. This arrangement ensures that the elongated housing 2, and therefore, the elongated filter 1 within, are both positioned within a bottle during the preferred usage of the present invention. The plurality of flexible annular fins 18 circumferentially tapers from the proximal fin 19 to the distal fin 20. Thus, the present invention is equipped to fit within a wide variety of bottle opening sizes, with the appropriate fin of the plurality of flexible annular fins 18 forming a hermetic seal that secures the present invention to the bottle.

Figure 8:
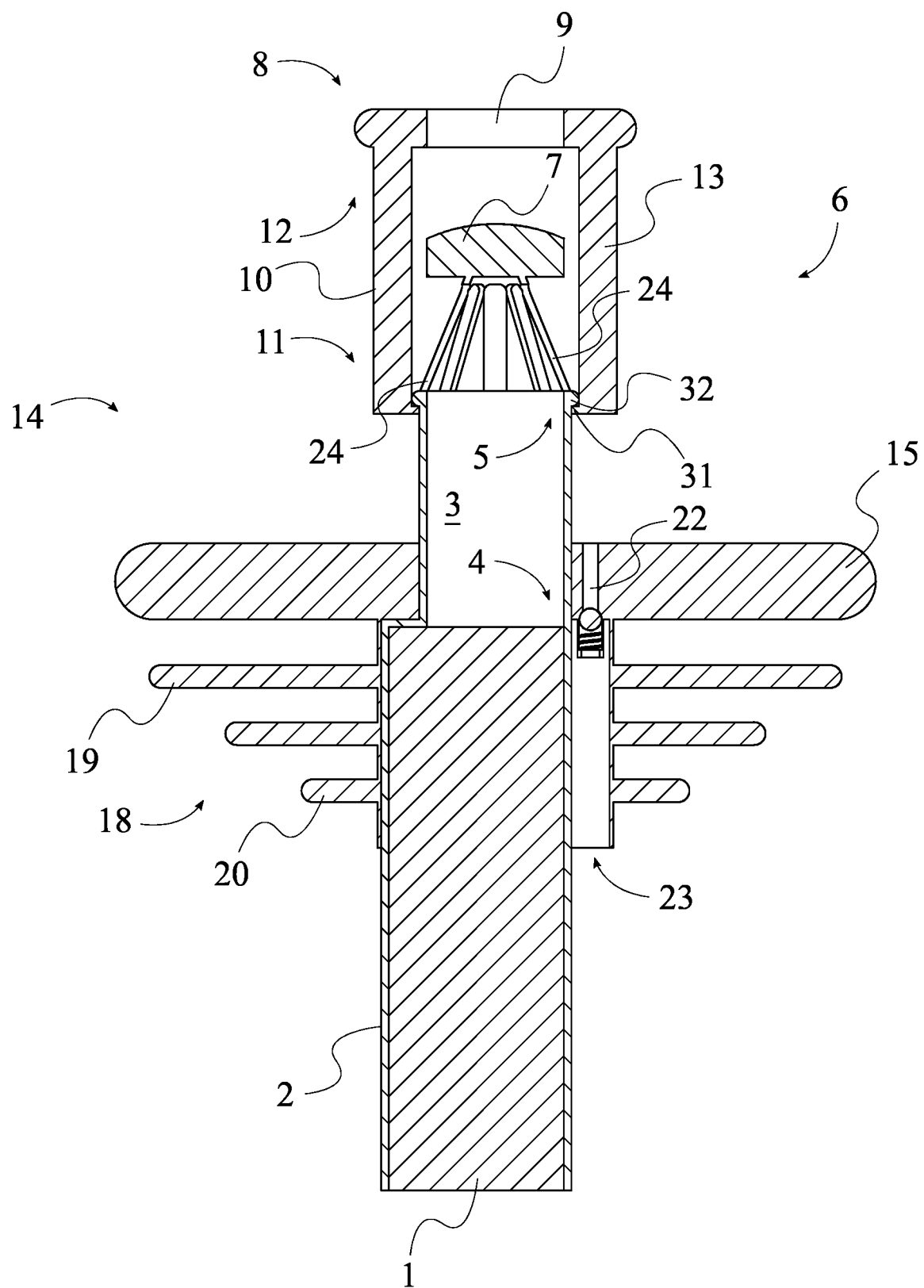
FIG. 8 is a cross-sectional view taken along line 8-8 in FIG. 7.

The present invention must be capable of both opening to allow liquids to exit the bottle and closing to prevent liquid from leaving the bottle. To this end, the present invention may further comprise a first annular ridge 31 and a second annular ridge 32, as shown in FIG. 8. The first annular ridge 31 is a protruding unit which may interact with the second annular ridge 32 to prevent the mouth cap 8 from separating from the fluid tube 3. Similarly, the second annular ridge 32 is a protruding unit which may interact with the first annular ridge 31 to prevent the mouth cap 8 from separating from the fluid tube 3. The first annular ridge 31 is connected within the cap body 10. Thus, the first annular ridge 31 is the contact point that allows the cap body 10 to interact with the fluid tube 3. The second annular ridge 32 is laterally connected to the fluid tube 3, offset from the second tube end 5. Therefore, the second annular ridge 32 is the contact point that allows the fluid tube 3 to interact with the cap body 10. The first annular ridge 31 and the second annular ridge 32 are positioned concentric with each other. In this way, the first annular ridge 31 and the second annular ridge 32 are positioned appropriately to prevent undesirable motion of the cap body 10 relative to the fluid tube 3.

The present invention requires the ability to allow fluid to exit the bottle. To this end, the mouth cap 8, the first annular ridge 31, and the second annular ridge 32 may be arranged in an open configuration, as shown in FIG. 7. This configuration allows fluid to pass through the mouth cap 8. The first annular ridge 31 is pressed against the second annular ridge 32. In this way, the stopper 7 is separated from the fluid channel 9, allowing fluid to exit while simultaneously preventing the mouth cap 8 from separating from the fluid tube 3.

The present invention further requires the ability to prevent fluid from exiting the bottle. To this end, the mouth cap 8, the first annular ridge 31, and the second annular ridge 32 may be arranged in a closed configuration, as shown in FIG. 5. This configuration prevents fluid from passing through the mouth cap 8. The first annular ridge 31 is positioned offset from the second annular ridge 32. In this way, the stopper 7 is in contact with the fluid channel 9, preventing fluid from exiting while simultaneously preventing the mouth cap 8 from separating from the fluid tube 3.

Although the invention has been explained in relation to its preferred embodiment, it is to be understood that many other possible modifications and variations can be made without departing from the spirit and scope of the invention as hereinafter claimed.

What is claimed is:

1. A retrofit bottle filtration device comprises:
    an elongated filter;
    an elongated housing defining a housing central axis;
    a fluid tube;
    a fluid-dispensing mechanism;
    a bottle-opening adapter;
    the fluid tube comprises a first tube end and a second tube end;

the fluid-dispensing mechanism comprises a stopper and a mouth cap;
the bottle-opening adapter defining an adapter central axis and comprising an annular lid and a plurality of flexible annular fins, the adapter central axis being radially offset from the central axis of the elongated housing;
the mouth cap comprises a fluid channel and a cap body;
the elongated filter being mounted within the elongated housing;
the elongated housing being connected adjacent to the first tube end;
the cap body being positioned adjacent to the second tube end;
the cap body being hermetically and slidably mounted about the fluid tube;
the fluid channel traversing through the cap body;
the fluid channel being positioned collinear to the fluid tube;
the stopper being operatively integrated between the cap body and the second tube end, wherein the stopper is used to selectively restrict fluid from exiting from the second tube end and through the mouth cap;
the mouth cap being in fluid communication with the elongated filter by the fluid tube;
the annular lid being positioned offset from the plurality of flexible annular fins;
the plurality of flexible annular fins being laterally connected around the elongated housing; and
the annular lid being laterally connected around the fluid tube.

2. The retrofit bottle filtration device as claimed in claim 1 comprises:
an air valve assembly;
the air valve assembly comprises an air tube and a valved inlet;
the air valve assembly being laterally positioned to the fluid tube;
the air tube traversing through the annular lid and through the plurality of flexible annular fins;
the air tube being positioned adjacent to the annular lid; and
the valved inlet being operatively integrated into the air tube, wherein the valved inlet is used to modulate fluid through the air tube.

3. The retrofit bottle filtration device as claimed in claim 1 comprises:
a plurality of support beams;
the plurality of support beams being radially positioned around the second tube end; and
the plurality of support beams being connected in between the stopper and the second tube end.

4. The retrofit bottle filtration device as claimed in claim 1 comprises:
the mouth cap further comprises a first mouth cap end, a second mouth cap end, and a protruding lip;
the first mouth cap end and the second mouth cap end being positioned opposite to each other about the cap body;
the first mouth cap end being positioned adjacent to the annular lid; and
the protruding lip being peripherally connected around the second mouth cap end.

5. The retrofit bottle filtration device as claimed in claim 1 comprises:
a mouthpiece cover;
the annular lid comprises a cover-receiving feature;
the cover-receiving feature being connected onto the annular lid;
the cover-receiving feature being positioned opposite to the plurality of flexible annular fins about the annular lid; and
the mouthpiece cover being removably attached onto the cover-receiving feature.

6. The retrofit bottle filtration device as claimed in claim 5 comprises:
a gasket;
the mouthpiece cover further comprises a proximal cover end and a distal cover end;
the proximal cover end being positioned adjacent to the annular lid; and
the gasket being connected within the mouthpiece cover, adjacent to the proximal cover end.

7. The retrofit bottle filtration device as claimed in claim 5, wherein the mouthpiece cover is threadably engaged to the cover receiver.

8. The retrofit bottle filtration device as claimed in claim 5 comprises:
a tether;
the annular lid further comprises a lid anchor;
the mouthpiece cover comprises a cover anchor;
the lid anchor being peripherally positioned to the annular lid; and
the tether being connected in between the lid anchor and the cover anchor.

9. The retrofit bottle filtration device as claimed in claim 1 comprises:
the plurality of flexible annular fins comprises a proximal fin and a distal fin;
the proximal fin being positioned adjacent to the annular lid;
the distal fin being positioned offset from the annular lid;
the plurality of flexible annular fins being distributed along the elongated housing in between the proximal fin and the distal fin; and
the plurality of flexible annular fins circumferentially tapering from the proximal fin to the distal fin.

10. The retrofit bottle filtration device as claimed in claim 1 comprises:
a first annular ridge;
a second annular ridge;
the first annular ridge being connected within the cap body;
the second annular ridge being laterally connected to the fluid tube, offset from the second tube end; and
the first annular ridge and the second annular ridge being positioned concentric with each other.

11. The retrofit bottle filtration device as claimed in claim 10 comprises:
wherein the mouth cap, the first annular ridge, and the second annular ridge are in an open configuration; and
the first annular ridge being pressed against the second annular ridge.

12. The retrofit bottle filtration device as claimed in claim 10 comprises:
wherein the mouth cap, the first annular ridge, and the second annular ridge are in a closed configuration; and
the first annular ridge being positioned offset from the second annular ridge.

13. A retrofit bottle filtration device comprises:
an elongated filter;
an elongated housing;
a fluid tube;
a fluid-dispensing mechanism;

a bottle-opening adapter;
an air valve assembly;
a mouthpiece cover;
a tether;
the fluid tube comprises a first tube end and a second tube end;
the fluid-dispensing mechanism comprises a stopper and a mouth cap;
the bottle-opening adapter comprises an annular lid and a plurality of flexible annular fins;
the mouth cap comprises a fluid channel and a cap body;
the air valve assembly comprises an air tube and a valved inlet;
the annular lid comprises a cover-receiving feature and a lid anchor;
the mouthpiece cover comprises a cover anchor;
the plurality of flexible annular fins comprises a proximal fin and a distal fin;
the elongated filter being mounted within the elongated housing;
the elongated housing being connected adjacent to the first tube end;
the cap body being positioned adjacent to the second tube end;
the cap body being hermetically and slidably mounted about the fluid tube;
the fluid channel traversing through the cap body;
the fluid channel being positioned collinear to the fluid tube;
the stopper being operatively integrated between the cap body and the second tube end, wherein the stopper is used to selectively restrict fluid from exiting from the second tube end and through the mouth cap;
the mouth cap being in fluid communication with the elongated filter by the fluid tube;
the annular lid being positioned offset from the plurality of flexible annular fins;
the plurality of flexible annular fins being laterally connected around the elongated housing;
the annular lid being laterally connected around the fluid tube;
the air valve assembly being laterally positioned to the fluid tube;
the air tube traversing through the annular lid and through the plurality of flexible annular fins;
the air tube being positioned adjacent to the annular lid;
the valved inlet being operatively integrated into the air tube, wherein the valved inlet is used to modulate fluid through the air tube;
the lid anchor being peripherally positioned to the annular lid;
the tether being connected in between the lid anchor and the cover anchor;
the proximal fin being positioned adjacent to the annular lid;
the distal fin being positioned offset from the annular lid;
the cover-receiving feature being connected onto the annular lid;
the cover-receiving feature being positioned opposite to the plurality of flexible annular fins about the annular lid;
the mouthpiece cover being removably attached onto the cover-receiving feature;

the plurality of flexible annular fins being distributed along the elongated housing in between the proximal fin and the distal fin; and
the plurality of flexible annular fins circumferentially tapering from the proximal fin to the distal fin.

14. The retrofit bottle filtration device as claimed in claim 13 comprises:
a plurality of support beams;
the plurality of support beams being radially positioned around the second tube end; and
the plurality of support beams being connected in between the stopper and the second tube end.

15. The retrofit bottle filtration device as claimed in claim 13 comprises:
the mouth cap further comprises a first mouth cap end, a second mouth cap end, and a protruding lip;
the first mouth cap end and the second mouth cap end being positioned opposite to each other about the cap body;
the first mouth cap end being positioned adjacent to the annular lid; and
the protruding lip being peripherally connected around the second mouth cap end.

16. The retrofit bottle filtration device as claimed in claim 13 comprises:
a gasket;
the mouthpiece cover further comprises a proximal cover end and a distal cover end;
the proximal cover end being positioned adjacent to the annular lid; and
the gasket being connected within the mouthpiece cover, adjacent to the proximal cover end.

17. The retrofit bottle filtration device as claimed in claim 13, wherein the mouthpiece cover is threadably engaged to the cover-receiving feature.

18. The retrofit bottle filtration device as claimed in claim 13 comprises:
a first annular ridge;
a second annular ridge;
the first annular ridge being connected within the cap body;
the second annular ridge being laterally connected to the fluid tube, offset from the second tube end; and
the first annular ridge and the second annular ridge being positioned concentric with each other.

19. The retrofit bottle filtration device as claimed in claim 18 comprises:
wherein the mouth cap, the first annular ridge, and the second annular ridge are in an open configuration; and
the first annular ridge being pressed against the second annular ridge.

20. The retrofit bottle filtration device as claimed in claim 18 comprises:
wherein the mouth cap, the first annular ridge, and the second annular ridge are in a closed configuration; and
the first annular ridge being positioned offset from the second annular ridge.

* * * * *